(12) United States Patent
Millard

(10) Patent No.: US 6,654,699 B2
(45) Date of Patent: Nov. 25, 2003

(54) COMPUTER NETWORK TESTING SYSTEM AND METHOD USING CLIENT PLAYBACK OF EDITED NETWORK INFORMATION

(75) Inventor: Adam C. Millard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 09/751,704

(22) Filed: Dec. 29, 2000

(65) Prior Publication Data

US 2002/0087282 A1 Jul. 4, 2002

(51) Int. Cl.[7] .......................... G06F 11/30; G06F 15/00
(52) U.S. Cl. .................... 702/108; 702/186; 709/105; 709/223
(58) Field of Search ............................. 702/186, 108; 709/105, 203, 223, 224, 225, 226

(56) References Cited

U.S. PATENT DOCUMENTS

| | | | | |
|---|---|---|---|---|
| 5,761,486 A | * | 6/1998 | Watanabe et al. | 703/21 |
| 5,974,572 A | * | 10/1999 | Weinberg et al. | 714/47 |
| 6,138,157 A | * | 10/2000 | Welter et al. | 709/224 |
| 6,167,534 A | * | 12/2000 | Straathof et al. | 714/38 |
| 6,205,413 B1 | * | 3/2001 | Bisdikian et al. | 703/24 |
| 6,295,557 B1 | * | 9/2001 | Foss et al. | 709/224 |
| 6,317,787 B1 | * | 11/2001 | Boyd et al. | 709/224 |
| 6,324,492 B1 | * | 11/2001 | Rowe | 703/13 |
| 6,360,332 B1 | * | 3/2002 | Weinberg et al. | 714/4 |
| 6,418,544 B1 | * | 7/2002 | Nesbitt et al. | 714/43 |
| 6,477,483 B1 | * | 11/2002 | Scarlat et al. | 702/186 |
| 2002/0177977 A1 | * | 11/2002 | Scarlat et al. | 702/186 |

OTHER PUBLICATIONS

Agarwal et al., "Ensuring WebSite Quality: A Case Study", IEEE, 2000.*
Mercury Interactive Corp. White Paper on 'Load Testing to Predict Web Performance', copyright 2000.*

* cited by examiner

Primary Examiner—Patrick Assouad
(74) Attorney, Agent, or Firm—Lyon & Harr, L.L.P.; Craig S. Fischer

(57) ABSTRACT

A system and method for computer network testing using a production machine and client to playback edited network information to a target machine. In general, the system of the present invention includes a target machine, a production machine, a playback machine, a playback file, a playback controller and a network information editor. The playback file includes network information collected by the production machine in a production environment and edited by the network information editor. The playback machine reads the playback file and send the edited network information (such as network requests) contained in the playback file to the target machine. The playback controller initiates and coordinates the playback of the playback file on the playback machine. The present invention can also perform stress testing of the target machine by altering the amount of network information sent to the target machine within a given time. This enables the present invention to, for example, decrease or increase the number of network requests sent to the target machine within a given time period thereby increasing the stress on the target machine. The method of the present invention uses the system of the present invention and generally includes testing a target machine by using a playback machine in communication with a production machine to playback edited network information to the target machine.

33 Claims, 6 Drawing Sheets

COMPUTER NETWORK TESTING SYSTEM AND METHOD USING CLIENT PLAYBACK OF EDITED NETWORK INFORMATION

BACKGROUND OF THE INVENTION

1. Field of the Invention

The present invention relates in general gather to a computer network and more particularly to a system and method for computer network testing using a production machine and client to playback edited network information to a target machine in order to test the target machine.

2. Related Art

Computer networks are common and vitally important in many diverse applications including business, universities and government. In general, a computer network is two or more computers (or associated machines and devices) that are connected by a communications link. A computer network generally includes a server, which is a computer that provides shared resources to users of the network, and a client, which is a computer that accesses the shared network resources provided by the server using the communication link. For example, the Internet (via the World Wide Web (WWW)) is a wide-area network (WAN) environment whereby a Web server delivers (or serves up) Web pages to a client that communicates a request over the network to the Web server.

The need for reliable network servers is becoming more crucial as an increasing amount of business is conducted over the Internet. In order to assure this reliability, often it is desirable to test a network server before putting the server into production. This testing is used to determine how the server will perform in a production environment and to maximize server performance. One useful technique for testing server reliability and performance is stress testing. Stress testing tests a network server in a controlled setting by using a client to communicate network requests to the server in order to load the server with incoming network requests. Stress testing is highly useful in exposing software or hardware defects and, in multi-processor servers, in finding threading defects. In addition, stress testing is useful in capacity planning of a network, and helps predict whether the number of network servers is sufficient to handle the anticipated incoming network requests. By stress testing the network server to obtain maximum load capability and speed, a network administrator can determine the optimal number of network servers needed to handle the anticipated incoming network requests.

A common approach to stress testing is to use an analysis tool to simulate a variety of workload scenarios on the network server being tested (or target network server). These workload scenarios are simulated using a variety of scripted simulations, which are written by programmers and typically test the most common aspects of network performance. One problem with these scripted simulations, however, is that they are only imitations of the network requests encountered when the server is in a production environment. Moreover, because they are only simulations, they cannot capture every nuance and subtlety of actual network requests and rarely emulates what is encountered in an actual production situation (i.e., the "real-world"). Thus, even after using these scripted simulations the network administrator is often left wondering whether the network server will be capable of performing reliably in a production environment.

Accordingly, there exists a need for a computer network testing system and method for testing a network server that uses network information obtained in a production (or "real-world") environment. What is also needed is a computer network testing system and method that enables network information stored on a production server to be played back by a client to a target network server such that realistic testing of the target network serer is performed. What is further needed is the ability to edit the stored network information such that network information stored on the production server may be appended or subtracted. In addition, what is needed is the capability to stress test the target network server by increasing or decreasing the amount of network information sent to the target network server during a given time.

SUMMARY OF THE INVENTION

To overcome the limitations in the prior art as described above and other limitations that will become apparent upon reading and understanding the present specification, the present invention includes a system and method for computer network testing using a production machine and client to playback edited network information to a target machine. The present invention uses network information obtained in a production environment ("real-word" data) instead of scripted simulations to provide accurate and realistic testing of a target machine. In addition, the present invention allows the collected network information to be edited such that information may be added or subtracted. The present invention also provides stress testing of a target machine by allowing more network information to be sent to the target server during a shorter time period. The present invention offers low-cost testing of a target machine using actual production data that can determine how the target machine will perform in a production environment.

In general, the system of the present invention includes a target machine, a production machine, a playback file, a playback machine, a playback controller and a network information editor. The playback file includes network information collected by the production machine in a production environment and edited by the network information editor. The playback machine reads the playback file and sends the edited network information (such as network requests) contained in the playback file to the target machine. The playback controller initiates and coordinates the playback of the playback file on the playback machine. In a preferred embodiment, the playback controller includes a data collection module that collects data and statistics concerning the testing of the target machine and writes these statistics to an output file. In another preferred embodiment, the playback machine includes several playback clients, with each playback client having its own copy of the playback file at an identical location on each playback client. The network information editor is capable of taking the network information collected by the production machine and editing the information to, for example, add information or remove extraneous information. In addition, the network information editor is capable of altering the amount of network information sent to the target machine. This enables the present invention to, for example, decrease or increase the number of network requests sent to the target machine within a given time period thereby increasing or decreasing the stress on the target machine.

The method of the present invention uses the system of the present invention and generally includes testing a target machine by using a playback machine in communication with a production machine to playback edited network information to the target machine. More specifically, network information is collected by the production machine and the collected network information is edited to create a playback file. The playback machine then plays back the playback file to the target machine. In addition, the method also includes modifying the network information collected by the production machine including adding information, subtracting information, and altering the amount of network information sent to the target machine during a time period.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The present invention includes a computer network testing system and method for testing a target machine using edited network information collected by a production machine in a production environment. The present invention does not require that any additional components or software modules be installed on the production machine prior to collecting this network information. The edited network information is used to generate a playback file that is distributed to each client on the network. At a specified time, each client plays back the playback file to the target machine to test the target machine. The capability to edit the network information is important to the present invention because it allows the generation of a custom playback file. This custom playback file may contain more or less information than originally obtained in the production environment. For example, the playback file may contain less noise and more network requests than the original collected network information. By providing editing capabilities, the present invention allows creation of a playback file that can be tailored to suit the needs of a user wanting to test a target machine.

Figure 1:
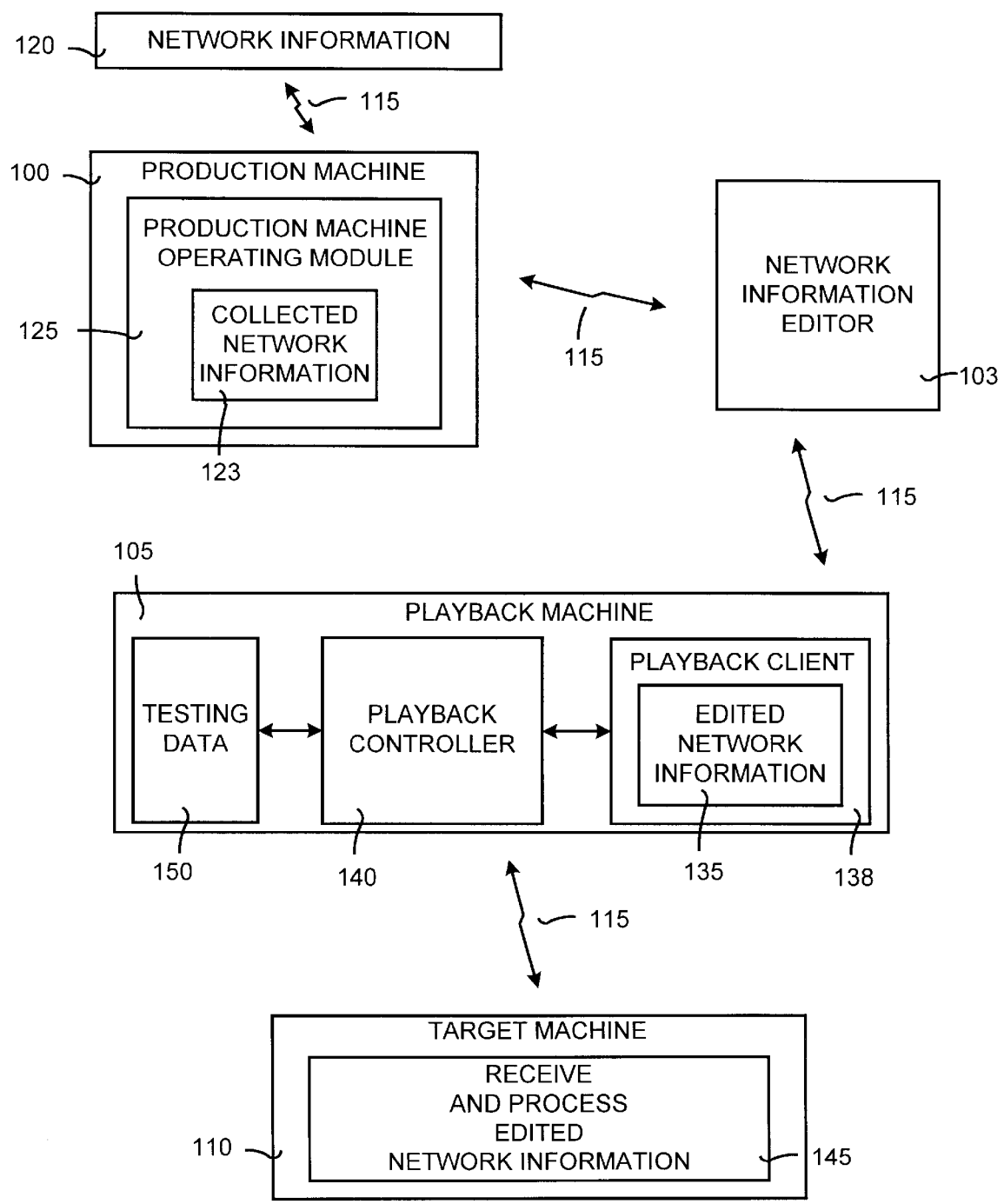
FIG. 1 is a block diagram illustrating an overview of the present invention.

FIG. 1 is a block diagram illustrating an overview of the present invention. In general, network information is obtained in a production environment, edited and played back to a target machine to evaluate the target machine. More specifically, a production machine 100, a network information editor 103, a playback machine 105 and a target machine 110 are in network communication with each other over communication links 115. These communication links 115 are generic means of transferring information and data between machines and devices and include both wire and wireless technologies. In addition, the type of data transfer occurring over these communication links 115 is varied. For example, the production machine 100 may transfer data to the network information editor 103 over the communication link 115 by copying a file, while the playback machine 105 may communicate with the target machine 110 over the communication links 115 using a series of calls over sockets. Those having ordinary skill in the art will appreciate that the communication links 115 represent several means of transferring information between machines and devices.

Network information 120 is communicated over the communication links 115 to and from the production machine 100 (such as a production web server) in a production environment. A production environment includes any network environment whereby the machines are serving actual or real (as opposed to test or simulated) customer requests. In other words, a production environment are the machines with which an actual customer interacts. These machines may include, for example, web, structured query language (SQL), message, scheduling or any other proprietary servers that play a role in serving a customer. Production environments are generally in continuous operation (24 hours per day, 7 days per week), have a high availability rate and minimal downtime, and have an operational staff observing each aspect of the production environment.

The production machine 100 collects the network information 120 to generate collected network information 123. By way of example, collected network information 123 may include network request information, request status, and referring and requested uniform resource locators (URL). It should be noted that the collected network information 123 is not necessarily the same as the network information 120. In other words, the production machine 100 does not necessarily need to collect all of the available network information 120. The production machine 100 includes a production machine operating module 125 that enables the production machine 100 to operate. In general, this production machine operating module 125 is necessary for the production machine 100 to perform as a production machine. One feature of the production machine operating module 125 is the collection and chronicling of information (such as network requests) received and transmitted over the network by the production machine 100. In a preferred embodiment, this generation of the collected network information (and the possible chronicling (or storing) of the collected network information 123) is a fundamental feature of the production machine operating module 125. The production machine 100 communicates with the network information editor 103 that is capable of editing the collected network information 123 on the production machine 100 to generate edited network information 135. In a preferred embodiment, the network information editor 103 resides on a machine separate from the production machine 100. However, it should be noted that in an alternate embodiment the network information editor 103 may reside on the production machine 100.

The playback machine 105 includes the edited network information 135 residing on a playback client 138. A playback controller 140 controls the play back of the edited network information 135 from the playback client 138 to the target machine 110 over the communication links 115. The target machine 110 receives and processes the edited network information 145 and, for example, the target machine is tested by observing the target machine's response to the edited network information. Testing data 150 about the target machine 110 is collected by the playback machine 105 in order to evaluate the performance of the target machine 110.

II. Exemplary Operating Environment

Figure 2:
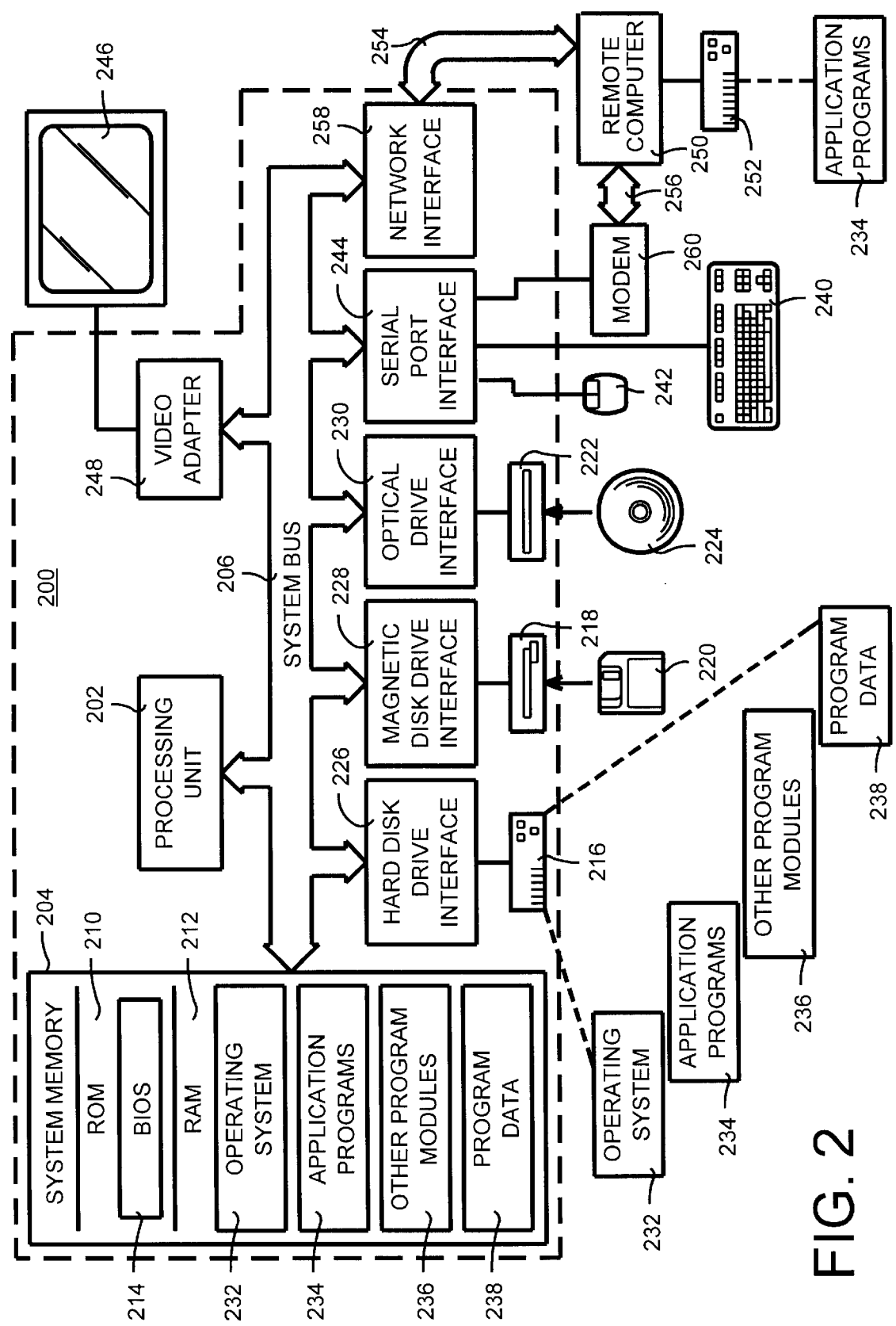
FIG. 2 is a general block diagram illustrating a computing apparatus that preferably may be used to carry out the present invention.

In a preferred embodiment, the production machine 100, the network information editor 103, the playback machine 105, the playback client 138 and the target machine 110 are computing machines (or devices) in a computing environment (such as a client/server networking environment). FIG. 2 and the following discussion are intended to provide a brief, general description of a suitable computing environment in which the computer network testing system and method of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 2, an exemplary system for implementing the present invention includes a general-purpose computing device in the form of a conventional personal computer 200, including a processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the personal computer 200, such as during start-up, is stored in ROM 210. The personal computer 200 further includes a hard disk drive 216 for reading from and writing to a hard disk (not shown), a magnetic disk drive 218 for reading from or writing to a removable magnetic disk 220, and an optical disk drive 222 for reading from or writing to a removable optical disk 224 (such as a CD-ROM or other optical media). The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the personal computer 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the personal computer 200 through input devices such as a keyboard 240 and a pointing device 242. In addition, other input devices (not shown) may be connected to the personal computer 200 including, for example, a microphone, joystick, game pad, satellite dish, scanner, and the like. These other input devices are often connected to the processing unit 202 through a serial port interface 244 that is coupled to the system bus 206, but may be connected by other interfaces, such as a parallel port, a game port or a universal serial bus (USB). A monitor 246 or other type of display device is also connected to the system bus 206 via an interface, such as a video adapter 248. In addition to the monitor 246, personal computers typically include other peripheral output devices (not shown), such as speakers and printers.

The personal computer 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the personal computer 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the personal computer 200 is connected to the local network 254 through a network interface or adapter 258. When used in a WAN networking environment, the personal computer 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the personal computer 200, or portions thereof, may be stored in the remote memory storage device 252. It will be appreciated that the network connections shown are exemplary and other means of establishing a communications link between the computers may be used.

III. Components and Operation of the Invention

Figure 3:
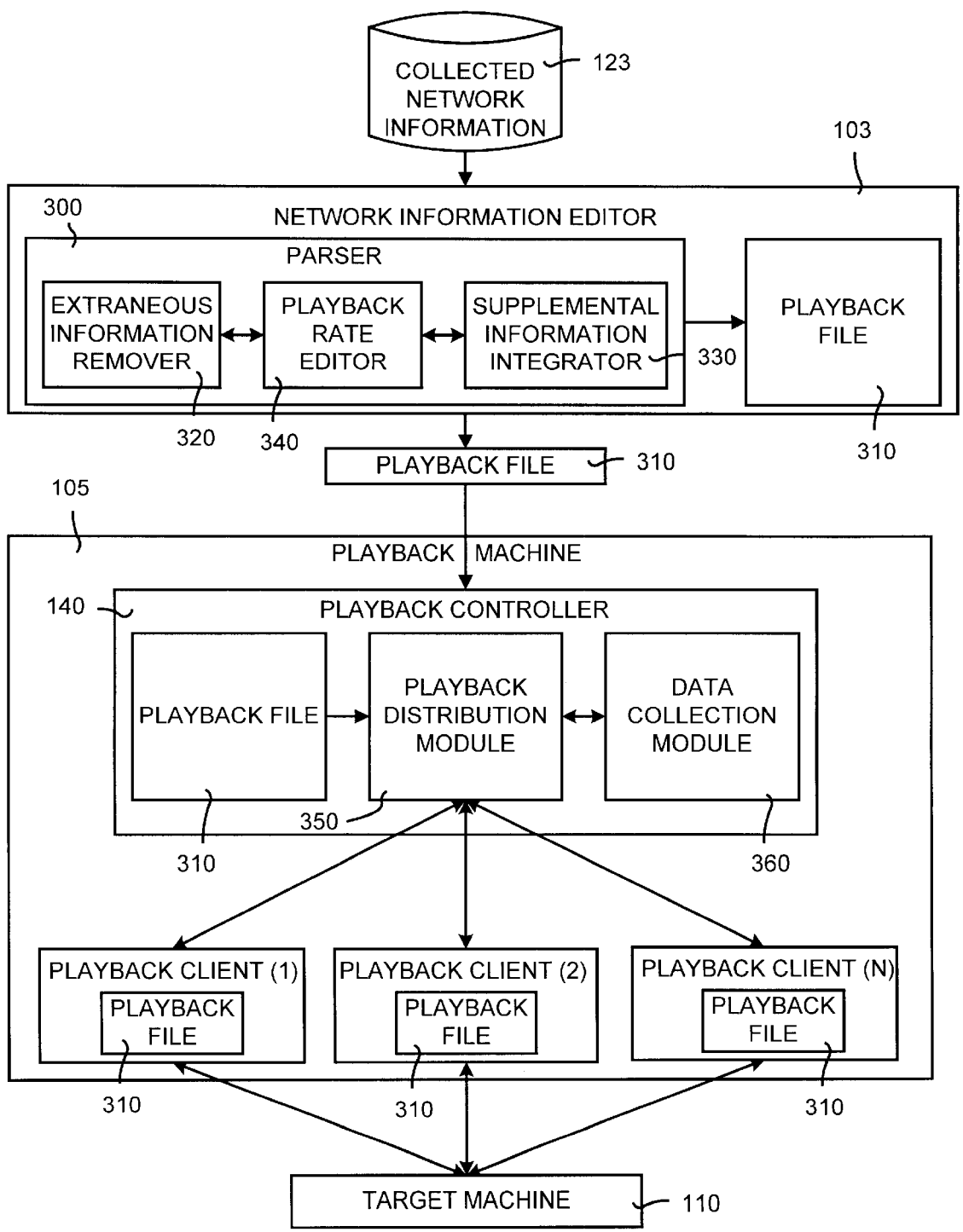
FIG. 3 is a general block diagram illustrating the interaction of the components of the present invention shown in FIG. 1.

The invention is embodied in a computer network testing system and method for testing a target machine. FIG. 3 is a general block diagram illustrating the interaction of the components of the present invention shown in FIG. 1. It should be noted that the computer network testing system illustrated in FIG. 3 is only one of several ways in which the present invention may be implemented.

In general, the computer network testing system of the present invention sends the collected network information 123 to the network information editor 103. The network information editor 103 includes a parser 300 that modifies the network information and generates a playback file 310. The parser 300 includes an extraneous information remover 320, which removes any irrelevant information from the collected network information 123 and a supplemental information integrator 330, which adds additional network information (such as network requests) to the collected network information 123. The extraneous information remover 320 and the supplemental information integrator 330 together allow the collect network information 123 to be modified such that a custom playback file 310 is generated. This playback file 310 is used to test the target machine 110 as desired by the user. The parser 300 also includes a playback rate editor 340 that permits the user to vary the rate at which that playback file 310 is played back to the target machine. By way of example, the playback rate editor 340 allows the target machine 110 to be stress tested by playing back the playback file 310 at a rate that was originally captured in the collected network information 123.

After editing of the collected network information 123, the playback file 310 is sent to the playback machine 105. The playback controller 140 of the playback machine 105 includes a playback distribution module 350 that receives the playback file 310 and distributes the playback file 310 to playback clients (1) to (N). In a preferred embodiment, the playback controller 140 resides on the playback machine 105 and each of the playback clients (1) to (N) are separate machines each containing a copy of the playback file 310. In an alternate embodiment, the playback controller 140 can reside on one of the playback clients (1) to (N). Each of the playback clients (1) to (N) are in network communication with the target machine 110 and, at specified time the playback distribution module 350 causes the execution of the playback file 310 on each of the playback clients (1) to (N). This time may be automatic or specified by a user.

Once the playback file 310 begins executing, the edited network information contained in the playback file 310 is send to the target machine 110. In addition, the target machine 110 processes and responds to the network information sent by the playback clients (1) to (N) and sends information and data back to the playback clients (1) to (N). In this manner, the target machine 110 is tested for functionality, performance and efficiency. The testing data obtained is sent to a data collection module 360 where it may be processed as desired for further evaluation.

Figure 4:
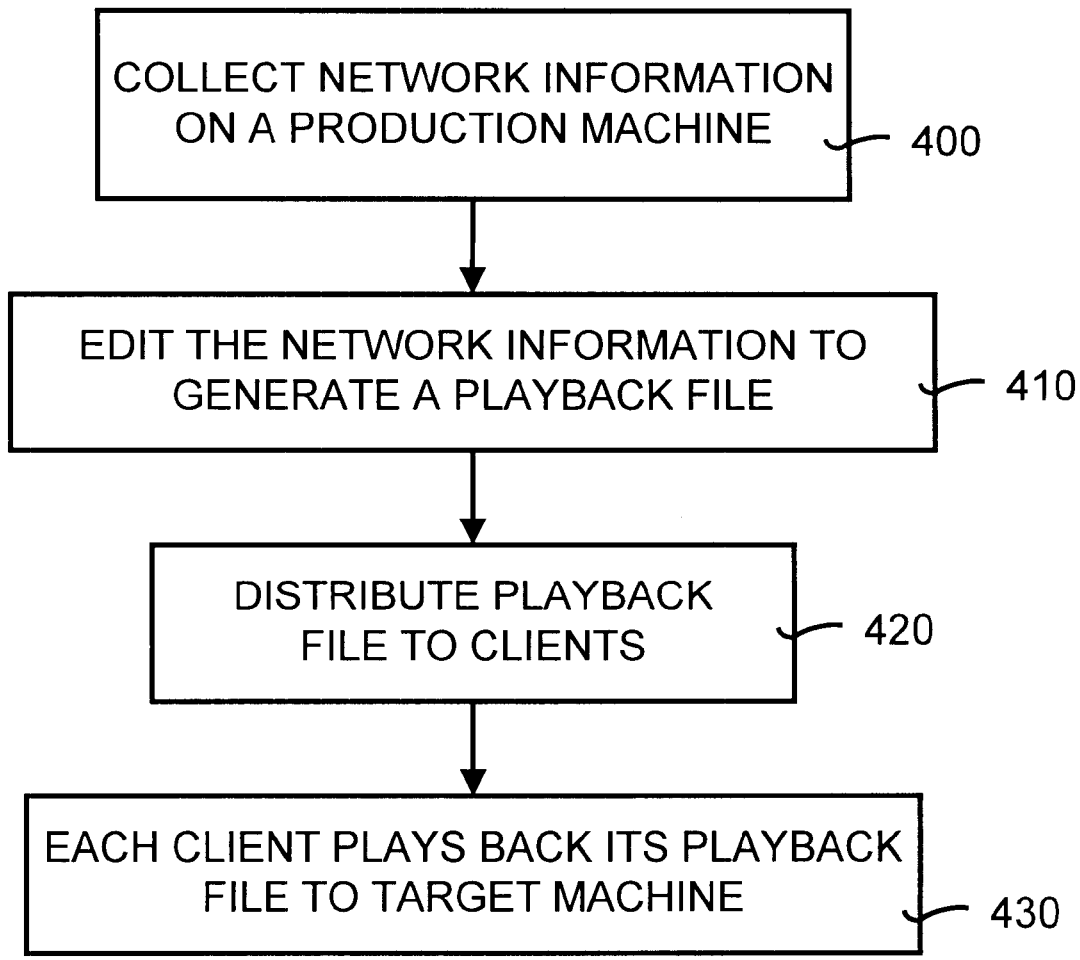
FIG. 4 is a general flow diagram of the operation of the computer network testing system shown in FIGS. 1 and 3.

FIG. 4 is a general flow diagram of the operation of the computer network testing system shown in FIGS. 1 and 3. In general, the method of the present invention plays back edited network information obtained in production environment to a target machine to test the target machine. More specifically, as shown in FIG. 4, network information is collected and stored on a production machine (box 400). The network information includes, for example, network requests, an identity of a user making the request and the time of the request. The network information is obtained in a production environment and thus contains "real-world" data and not scripted simulations. This network information is edited and a playback file is generated (box 410). Editing the network information includes adding information (such as network requests) and removing information (such as noise). In addition, editing includes varying the playback rates of the network information in order to, for example, stress test a target machine. Editing of the network information allows a playback file to be generated that plays back to the target machine the type of network information needed to thoroughly test the target machine while removing any unnecessary and extraneous information to speed up playback and testing. Once a playback file has been generated, it is distributed to each of the clients (box 420). Each client then plays back its playback file to the target machine (box 430) to provide testing of the target machine.

IV. Details of the Invention and Working Example

The following discussion presents details of an implementation and working example of the present invention. This working example is provided for illustrative purposes and is only one of several ways in which the present invention may be implemented. This working example uses a client/server network environment such that network requests are sent from a client to a server over the network to request data from the server. In this working example, the computer network testing system and method of the present invention is implemented as a utility for use with Internet Information Service (IIS). IIS is a service running on a computer that is tightly integrated with the computer's operating system. This particular implementation of the present invention is very useful for developers and testers who work with IIS on a daily basis in a production setting.

The present invention as implemented into this computer network testing utility plays back almost all network requests that customers make on a production web server. These are network requests that IIS (which is running on the production web server) already stores to a log file. In other words, no additional software needs to be installed on the production web server in order to operate the present invention. In addition, the computer network testing utility has the ability to increase or decrease the request rate of a given IIS log file, thereby adding a stress testing utility as well. The result is that the computer network testing utility of the present invention saves operational costs and allows existing hardware to be used in more efficiently.

Figure 5:
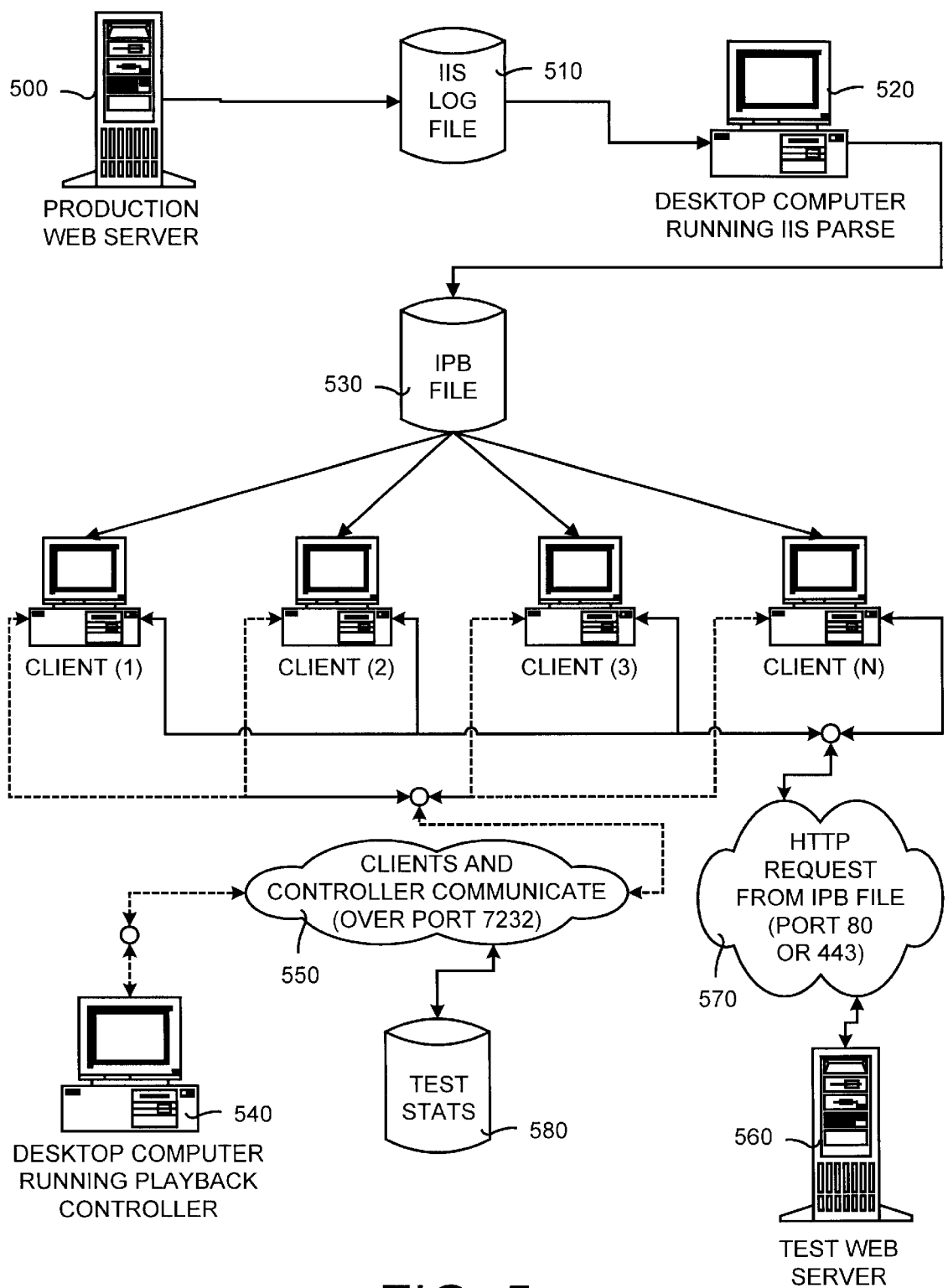
FIG. 5 is a block diagram illustrating a working example of the computer network testing system of the present invention.

FIG. 5 is a block diagram illustrating the working example of the computer network testing system of the present invention. A production web server 500 running IIS is in a production environment and receives requests that are stored in the IIS log file 510. When the computer network testing utility of the present invention is run, the IIS log file 510 is sent to a desktop computer running IIS parse 520. IIS parse edits the IIS log file and is capable of removing or adding information, such as network requests. IIS parse generates an IPB file 530 (a playback file having an investor playback (or IPB) extension) that is copied to each client, client (1) to client (N), on the network.

A desktop computer running playback controller 540 controls the playback of the IPB file 530 on each client. The playback controller 540 and the clients communicate 550 over a communication link (such as port 7232). At a specified time, the playback controller 540 begins playback of the IPB file 530 on each client such that network requests (in the form of hypertext transport protocol (HTTP) requests) are sent to a test web server 560. The test web server 560, whose contents mirror the production web server 500, receives and processes the HTTP requests contained in the IPB file as they are over the network 570 either on port 80 (unsecured) or port 443 (secured). Test statistics 580 from the playback of the IPB file are collected for further evaluation and processing.

Figure 6:
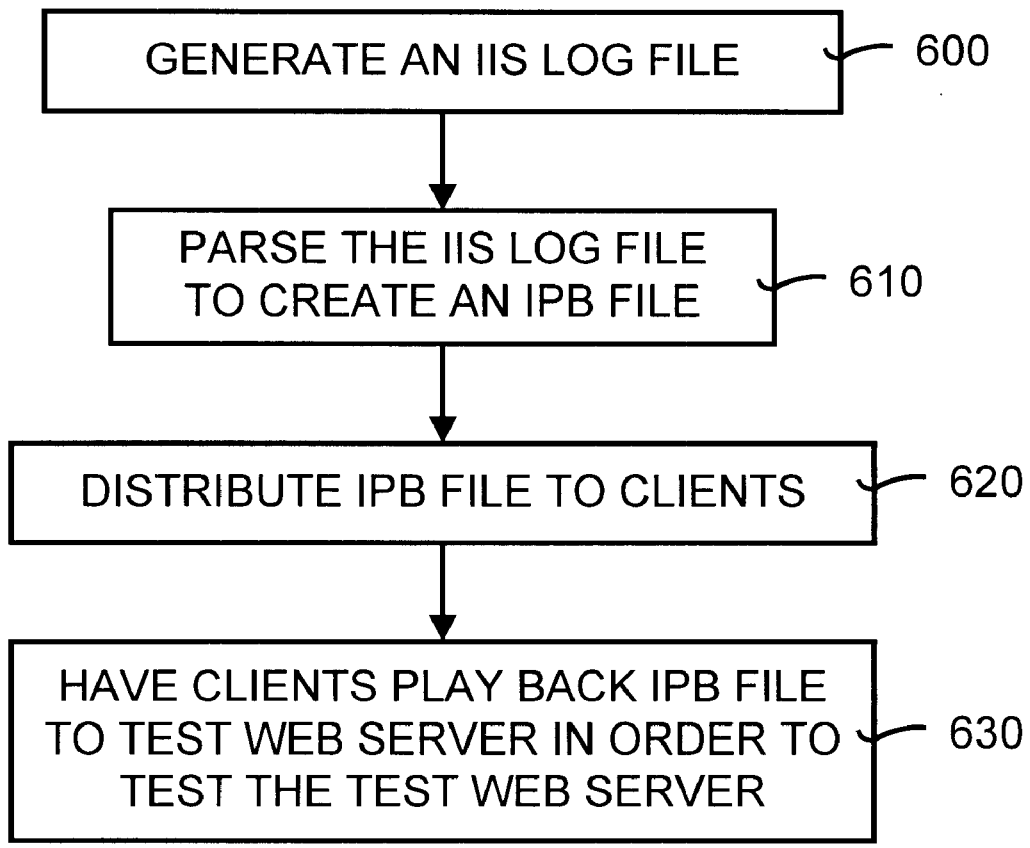
FIG. 6 is a flow diagram illustrating the general operation of the working example of FIG. 5.

FIG. 6 is a flow diagram illustrating the general operation of the computer network testing system of FIG. 5. The operation of this utility begins with IIS generating a log file as part of the operation of IIS (box 600). Next, the IIS log file is parsed and edited to create an IPB file (box 610) that is distributed to all clients on the network (box 620). At a specified time, the client playback the IPB file to the test web server in order to test the test web server (box 630).

As a working example of how the computer network testing system and method of the present invention may be used, consider a web server on a production site that has crashed for unknown reasons. Although the problem must be debugged and fixed, the production web server cannot be taken offline on the live site in order to determine and fix the problem. Instead, the computer network testing utility of the present invention may be used by first obtaining the IIS log from the point up to the crash from the web server.

Initially, the IIS log file must be put into a format that the playback clients can understand. In this working example, the IIS log file was captured using the "Microsoft IIS log format" standard, with an additional feature that captures a user's agent (or browser type) of every incoming request. The IIS log file is provided as input to IIS parse, and one of the functions of IIS parse is to reduce all the noise contained in the IIS log file. This noise reduction by IIS parse reduces the size of the IIS log file by 40–60%. It should be noted that the IIS log file contains a wealth of information, such as the date and time of each network request, the URL requested, HTTP status code of the request, query string, referring URL and many additional fields. The computer network testing utility of the present invention generally does not need all this information. Instead, the present invention generally only uses the requested URL, user agent, any query string associated with the request, resulting HTTP status code of request and any GUID information contained in the cookie of the user.

In addition to removing useless information from the IIS log file, IIS parse can also increase or decrease the rate of network requests. Specifically, each row in the IIS log file has a date and time associated with the network request, and IIS parse converts this time into milliseconds starting from time zero (usually the first request in the IIS log file). A user can increase or decrease the time between network requests, thus enabling the computer network testing utility of the present invention to also be used as stress testing utility. For example, using the stress testing feature of the present invention, a full day's worth of network requests may be played back to the test web serer in half the time. Further, IIS parse can also modify URLs on the fly, replacing one URL with another or increasing the frequency in which a particular URL (or web page) is requested. Thus, the stress testing feature of the present invention may be used to test the effects of what would happen if a yet-to-be-marketed feature on a web page becomes heavily requested. IIS parse generates a playback file that is signified by the IPB extension. The IPB file is a tab-delimited text file with the following format:

time, URL, query string, user agent, HTTP status code, GUID, SSL bit where time is the time (in milliseconds) between network requests, URL is the actual page requested, query string, user agent, HTTP status code and GUID are network information associated with the network request, and the SSL bit states whether to send the network request in a non-secure manner (HTTP-port 80) or a secure manner (HTTPS-port 443). IIS parse was written in C++ simply because of the size of the I(S log files (normally about 1.3 GB in size). IIS parse uses memory mapped files and breaks the IIS log file into 512 MB chunks in cases where the file is 2 GB or greater.

Once the IPB file has been generated, the IPB file can be played back against any given server using a playback client. The playback client itself is capable of reading the IPB file as its source of requests, and is also capable of making the HTTP requests contained in the IPB file at a high rate of speed. The playback client reads tab-delimited IPB file and is capable of playing back the network requests in a multiple client setting. The IPB file is taken from IIS parse and the entire IPB file is copied to the same location (e.g., c:/Client) on each playback client. Although this may be somewhat arduous for large files, a tradeoff was made to have the IPB file be local on each machine so that time could be spent on sending requests, not waiting on them from the playback controller. In addition, each playback client needs to be configured so that it knows the location of the playback controller. This is done generating and running a configuration batch file (config.bat). This configuration file sets two environment variables containing the name and IP address of the machine containing the playback controller. These variables are read by each playback client upon startup.

The playback controller is responsible for reading in the location of the IPB file (which is why it must be in the same location on all playback clients) and the name of the server to which these requests will be played back against. The playback controller starts up and waits for all playback clients to access Winsock over port 7232. The playback controller knows in advance how many clients will be participating in a certain test run, as well as the location of the IPB file on each client. This information is contained in a script file that is read in by the playback controller on startup. Moreover, logic is needed so that different playback clients are not playing back the same network request. The solution is that every playback client is given a zero-based number by the playback controller. That number is used to skip lines in the IPB file in an M+N fashion, where M is the zero-based number and N is the number of playback clients participating in a given run.

Once all playback clients are connected, the playback controller sends the zero based ID, the location of the IPB file on each playback client, the total number of playback clients and the name of the sever to play back all network requests against to each playback client. Once this is done, the playback controller collects testing statistics from each of the playback clients. For example, testing statistics may include such information as whether the playback clients were able to play the network requests back in the times specified in the IPB file, or whether they fell behind due to the fact that there were not enough clients.

Once the IPB file has been copied and all clients configured, the name of the test web server to play back network requests against is received from a config.cmd file (which sets an environment variable read in by the playback controller). A CFG file is also configured for the playback controller to, among other things, provide the number of playback clients and threads spawned on each playback client participating in the playback, as well as the location of the IPB file on each playback client.

After the playback client and playback controller have been configured, the playback controller is started using a run.cmd file. The run.cmd file takes as its only argument the name suffix of the configuration file in the scripts directory. For example, running "run test" means that test.cfg is the configuration file that contains the settings for the IPB file and the playback clients described above. The playback controller will wait for all playback clients to connect to it, and afterward running the client.bat file starts the playback clients. Once all the playback clients are connected, playback will start and the test will run until the entire IPB file has been played back. At the end of the test the playback clients will send status information back to the playback controller, which will collate the status information and display it to the user.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A target machine testing system, comprising:
    a production machine that collects network information to generate collected information thereon;
    an information editor in communication with the production machine capable of editing the collected information to generate edited information; and
    a playback machine in communication with the information editor that sends the edited information to a target machine to test the target machine.

2. The target machine testing system as set forth in claim 1, further comprising a production machine operating module disposed on the production machine that collects the information by chronicling information received and transmitted by the production machine.

3. The target machine testing system as set forth in claim 2, wherein the production machine operating module is necessary for the production machine to operate.

4. The target machine testing system as set forth in claim 2, wherein collecting the information is a fundamental feature of the production machine operating module.

5. The target machine testing system as set forth in claim 2, wherein no additional components or software modules are required to generate the collected information.

6. The target machine testing system as set forth in claim 1, wherein the playback machine further comprises:
    a playback client that plays back the edited information to the target machine; and
    a playback controller that provides control of the play back from the playback client to the target machine.

7. The target machine testing system as set forth in claim 6, wherein the playback client is a plurality of playback clients each containing a playback file that contains the edited information.

8. The target machine testing system as set forth in claim 7, wherein the playback controller comprises a playback distribution module that distributes copies of the playback file to each playback client.

9. The target machine testing system as set forth in claim 6, wherein the playback controller further comprises a data collection module that collects test data concerning the target machine.

10. The target machine testing system as set forth in claim 1, wherein the collected information is at least part of network information obtained in a production environment.

11. The target machine testing system as set forth in claim 10, wherein the collected network information includes network requests made to the production machine.

12. A method for testing a target machine using a production machine and a playback machine all in communication through a communication link, comprising:
    using the production machine to collect information obtained in a production environment;
    editing the collected information to generate edited information; and
    transmitting the edited information from the playback machine to the target machine over the communication link to test the target machine.

13. A computer-readable medium having computer-executable instructions for performing the method recited in claim 12.

14. The method as set forth in claim 12, wherein collecting the information obtained in a production environment is a normal feature of the production machine.

15. The method as set forth in claim 12, further comprising generating a playback file using the edited information.

16. The method as set forth in claim 15, wherein the playback file is used to transmit the edited information from the playback machine to the target machine.

17. The method as set forth in claim 15, wherein the playback machine includes plurality of playback clients and the method further comprises distributing copies of the playback file to each of the plurality of playback clients.

18. The method as set forth in claim 17, further comprising having each of the plurality of playback clients play back its copy of the playback file to the target machine.

19. The method as set forth in claim 18, further comprising controlling the play back of each copy of the playback file to test the target machine.

20. A computer-readable medium having computer-executable instructions for performing a method for testing a test server on a computer network using a production server and a playback client, comprising:
    generating a log file on the production server containing network information;
    parsing the log file to create a playback file;
    distributing the log file to the playback client; and
    causing the playback client to play back the playback file to the test server.

21. The computer-readable medium as set forth in claim 20, wherein the log file is an Internet Information Service (IIS) log file.

22. The computer-readable medium as set forth in claim 20 having computer-executable instructions for collecting test data from the playback client and test server.

23. A computer network testing system for stress testing a network server, comprising:
    a production machine that collects network requests;
    a playback client in communication with the network server;
    a playback file located on the playback client containing the network requests; and
    a playback controller for causing playback of the playback file such that the playback client communicates the network requests to the network server.

24. The computer network testing system as set forth in claim 23, wherein the network requests are obtained in a production environment.

25. The computer network testing system as set forth in claim 23, wherein the playback client reads the playback file as a source of network requests to the network server.

26. The computer network testing system as set forth in claim 25, wherein the playback client is a plurality of playback clients and the playback file is located at the same location on each of the plurality of playback clients.

27. The computer network testing system as set forth in claim 23, further comprising a data collection module that collects data regarding the stress testing.

28. The computer network testing system as set forth in claim 23, further comprising a network information editor capable of generating the playback file.

29. The computer network testing system as set forth in claim 23, wherein the network information editor further comprises a playback rate editor capable of altering a time interval between the network requests.

30. A method for stress testing a server connected to a network, the network containing a client in communication with the server, comprising:

using a production machine to collect network requests; using storing a playback file containing the network requests on the client; and playing back the network requests such that the client transmits the network requests to the server.

31. The method as set forth in claim 30, wherein the network requests are collected by a production server in a production environment.

32. The method as set forth in claim 30, further comprising creating the playback file by editing a log file containing actual network requests made to a production server in a production environment.

33. The method as set forth in claim 30, further comprising varying a time interval between network requests to increase or decrease a rate of requests sent to the server.

* * * * *